United States Patent [19]

Iwasa et al.

[11] Patent Number: 5,247,140
[45] Date of Patent: Sep. 21, 1993

[54] BRAKE CONTROL SYSTEM IN ELEVATOR CONTROL APPARATUS

[75] Inventors: Masao Iwasa, Ichikawa; Koji Yamada; Hirofumi Sugiura, both of Aichi, all of Japan

[73] Assignee: Otis Elevator Company, Farmington, Conn.

[21] Appl. No.: 741,273

[22] Filed: Aug. 7, 1991

[30] Foreign Application Priority Data

Aug. 13, 1990 [JP] Japan .................. 2-214019

[51] Int. Cl.⁵ .............................. H02P 3/04
[52] U.S. Cl. .................. 187/108; 187/115; 318/757
[58] Field of Search .......... 187/108, 112, 115; 361/154; 318/757, 759

[56] References Cited

U.S. PATENT DOCUMENTS

| | | | |
|---|---|---|---|
| 4,479,565 | 10/1984 | Nomura | 187/108 |
| 4,503,940 | 3/1985 | Watanabe | 187/108 |
| 4,667,776 | 5/1987 | Nomura | 187/105 |
| 4,678,980 | 7/1987 | Sugimoto et al. | 318/759 |
| 4,713,595 | 12/1987 | Yonemoto | 318/759 |
| 4,749,932 | 6/1988 | Yonemoto | 318/759 |
| 4,984,659 | 1/1991 | Nomura | 187/108 |
| 4,987,977 | 1/1991 | Nomura | 187/112 |

FOREIGN PATENT DOCUMENTS

| | | | |
|---|---|---|---|
| 0117477 | 7/1984 | Japan | 318/757 |
| 0106580 | 4/1990 | Japan | 187/108 |
| 2173057 | 10/1986 | United Kingdom | 187/108 |

*Primary Examiner*—Steven L. Stephan
*Assistant Examiner*—Thomas M. Dougherty
*Attorney, Agent, or Firm*—Joseph P. Abate

[57] ABSTRACT

The current an inverter is used as a power source for a brake circuit. The brake circuit includes a current detector, a comparator for comparing the detected value with a dictated brake current pattern, and a switch which switches the brake current in accordance with the magnitude of the difference between the detected current value and the dictated value. The brake current is selected to smoothly increase and decrease the brake current to prevent vibration and noise.

3 Claims, 6 Drawing Sheets

FIG.7(a) XLB
FIG.7(b) M1,M1'
FIG.7(c) M2
FIG.7(d) IB
FIG.7(e) BL

BRAKE CONTROL SYSTEM IN ELEVATOR CONTROL APPARATUS

TECHNICAL FIELD

This invention relates to elevators and, more particularly, to brake controls therefor.

BACKGROUND ART

Generally, an elevator may be driven by an induction motor, and an inverter may be used in the control apparatus to power the motor. While the inverter circuit and its control cannot be ignored for smooth control of the elevator, at the same time, control of the brake is extremely important.

Figure 6:
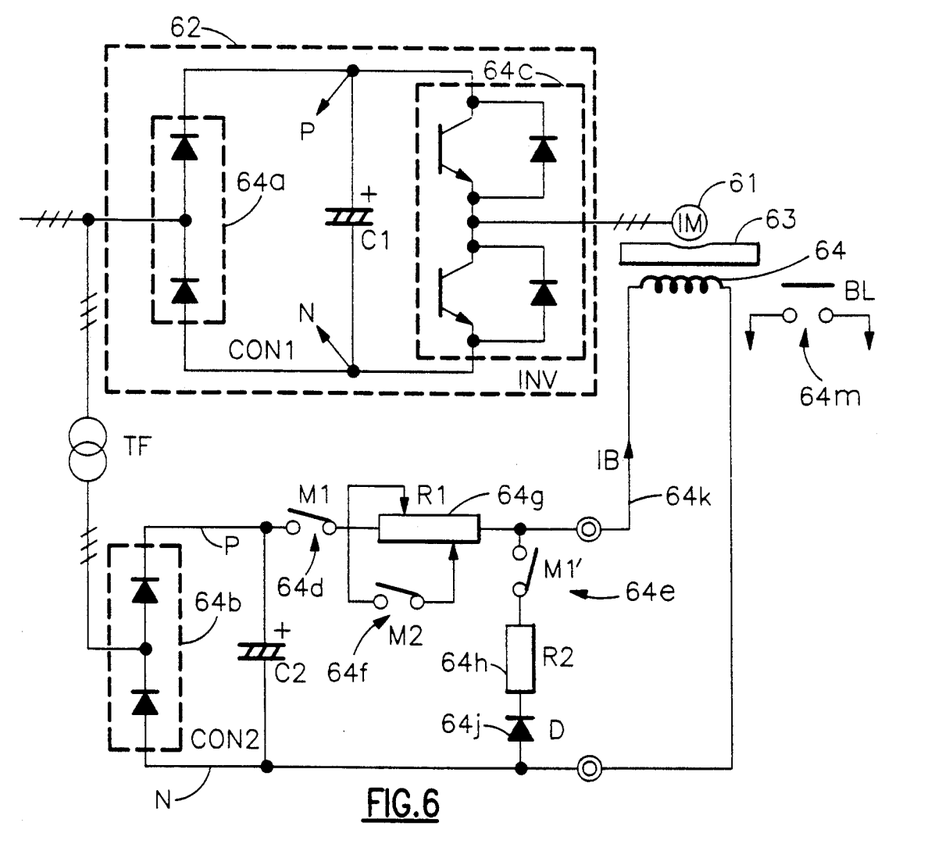
FIG. 6 is a diagram of an example of the prior technology.

FIG. 6 is a circuit diagram to illustrate an example of the brake control circuit of the prior technology. In FIG. 6, an induction motor 61 is controlled by an inverter circuit 62. Brake 63 has a brake coil 64 which is disposed on the shaft of the induction motor 61. In this diagram, TF is a three-phase transformer for generating the voltage for descending; CON1 and CON2 are labels for rectifying circuits 64a, 64b for forward conversion; C1 and C2 are smoothing capacitors; INV is a label for an inverter 64c for reversing; M1, M1', and M2 are labels for contacts 64d, 64e, 64f of a DC electromagnetic contactor (not shown) which causes the contacts to close in response to a lift brake command; R1 and R2 are labels for resistors 64g, 64h, DIS is a diode 64j; IB is a brake current on a line 64k; and BL is a contact 64m which is turned ON (close circuited) when the brake is completely open. With the brake control member, the voltage of the three-phase input power source to the inverter circuit 62 is lowered by the transformer TF to form a specific AC power source, and the current is converted by the rectifying circuit CON2 to form a braking power source. The rectified power source current, after being restricted by the resistor R1, flows to the brake coil 64 as the brake current IB.

Figure 7A:
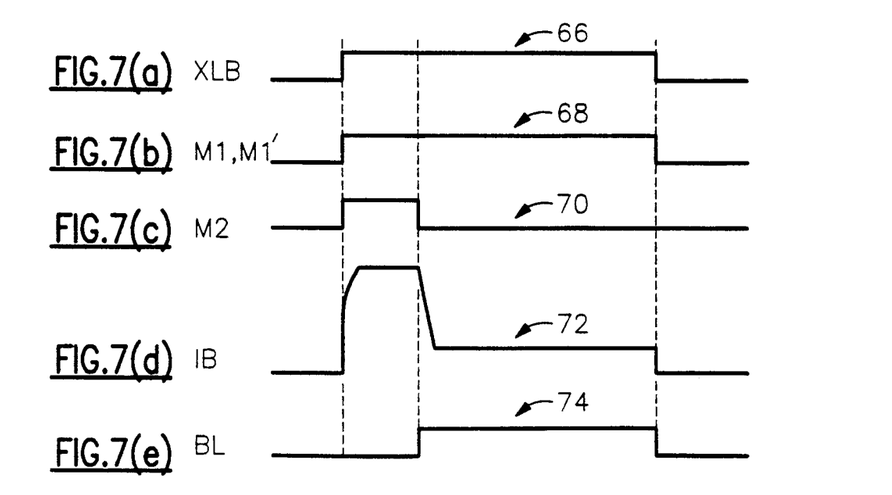
FIGS. 7 and 8 are time charts of the example of the prior technology.

FIG. 7 is a time chart having a common time base to illustrate an example of the operating sequence of each part of the above-mentioned brake control circuit. In FIG. 7, all commands are ON command at "High". With the brake OPEN command XLB as shown by a waveform 66 in FIG. 7 (a), the contacts M1, M1', and M2 of the electromagnetic contactor become ON (shorted) as shown by a waveform 68 in FIG. 7 (b) for M1 and M1' and a waveform 70 in FIG. 7 (c) for M2. Thus, brake current IB flows as shown by a waveform 72 in FIG. 7(d). As the brake OPEN procedure ends, the contact 64m (BL) is closed as indicated by a waveform 74 in FIG. 7 (e). In response to the BL signal, the contact M2 of the electromagnetic contactor becomes OFF (open circuited), and as a result, the brake current IB will be restricted by the resistor R1.

The time chart of the above-mentioned FIG. 7 is illustrated in more detail in FIG. 8. In FIG. 8, as an elevator operating command MU (Make Up) or MD (Make Down) is issued by an upper level controller (not shown) for elevator up or down travel as indicated by a waveform 76, the gate control of the inverter circuit which drives the induction motor will be started (I1) as shown in FIG. 8 (k) by a waveform 78 after taking into account the chattering of an associated contact of the relay, such as for example about 50 msec later; meantime a DC current to generate a static torque in the motor flows (DRIVE) as indicated in FIG. 8(b) by a waveform 80. At this point, a short time interval is set until a brake OPEN command signal (XLB) is initiated, as shown by a waveform 82 in FIG. 8 (c), to start lifting the brake and to initiate detection of the secondary time constant of the motor. The time of initiation is 50+670 (msec) after MU or MD went ON for the example illustrated in the driving.

As brake OPEN command (XLB) is generated by the motor control device, the electromagnetic contactor is triggered, as explained already in FIG. 6, and this will turn ON (close or short circuit) the contacts M1, M1' and M2. Thus, brake current IB flows to the brake coil 64 as indicated by a waveform 83 in FIG. 8(j) and the brake will be released. This will permit the elevator car to move.

Figures 8A, 8B:
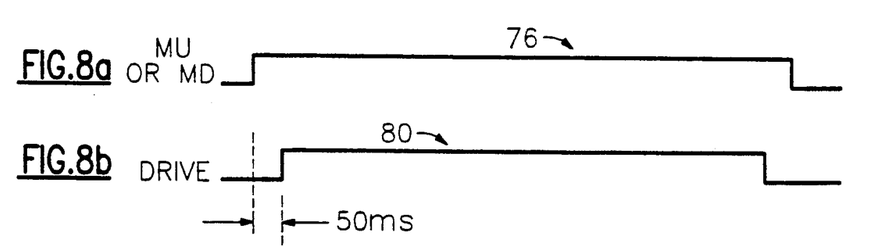
Figure 8C:
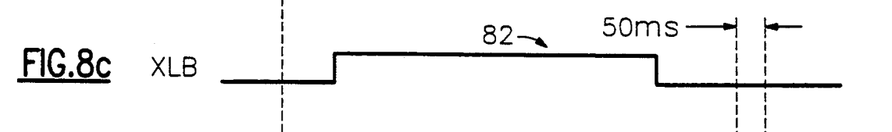
Figure 8D:
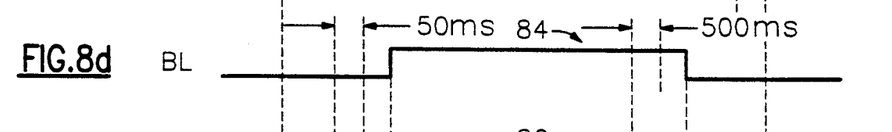
Figures 8E, 8F:
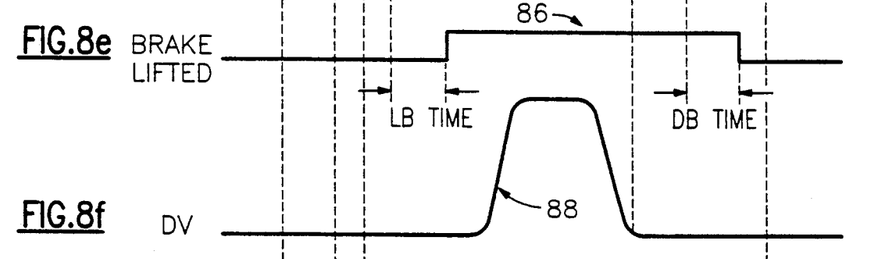
Figure 8G:
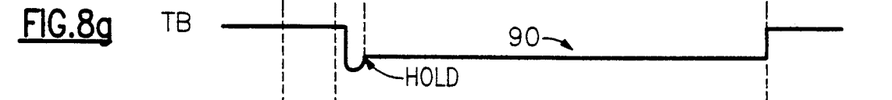
Figure 8H:
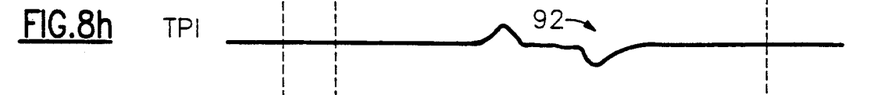
Figures 8I, 8J:
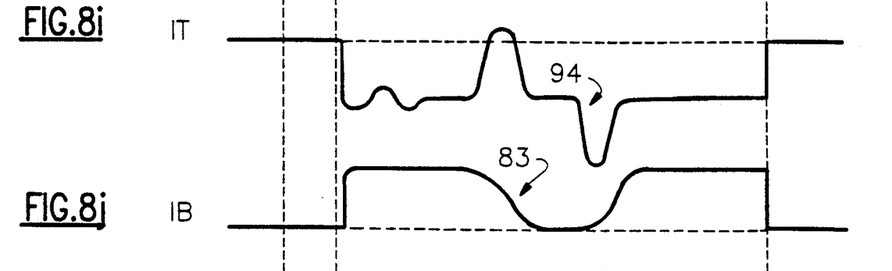
Figure 8K:
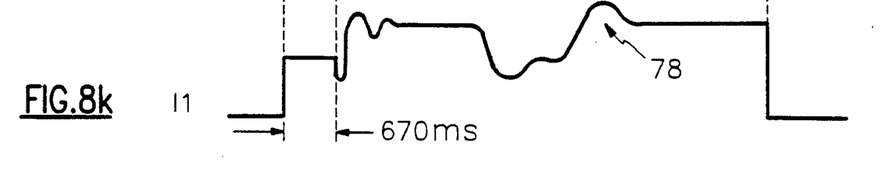

The BL contact 64 is the contact which will become ON (closed) when the brake operates mechanically as indicated by a waveform 84 in FIG. 8(d). Since there is some time lapse from the contacting part of the actual brake, the brake lifted (BL) signal will be in the "brake lifted" status at the timing which is corrected for lift brake (LB) time or drop brake (DB) time, as illustrated by a waveform 86 in FIG. 8(e), and thereafter the elevator control apparatus will control the speed or the position. In FIG. 8(f), a DV waveform 88 is a velocity command signal. FIG. 8(g) illustrates the brake torque by a TB waveform 90. FIG. 8(h) shows a speed feedback signal waveform 92 and FIG. 8(i) shows a dictated torque current waveform 94.

As the elevator reaches a target floor, a command is issued to turn OFF the brake OPEN signal (XLB) after a certain period, for example, after 500 msec. Thus, the contacting points M1 and M1' of the electromagnetic contactor are set at the OFF (open circuit) position, and this will cut off the current IB to the brake coil 64. The brake is closed, and the elevator control apparatus will close the brake circuit at the timing (BL+DB time), turn off the gate control of the main circuit, and enter into a status of waiting for receipt of a succeeding operational command.

DISCLOSURE OF THE INVENTION

However, with the above-mentioned circuit of the prior technology, as illustrated by the TB characteristic illustrated in FIG. 8, the torque required for releasing the brake is greater than the torque required for maintaining the release status. Therefore, after the release, the brake circuit generates a greater torque than is necessary. This will permit the flow of electric current at a level higher than necessary to the brake coil. Therefore, in the prior technology, as illustrated in FIG. 6, it was necessary to switch by means of the electromagnetic contact M2 so that resistance R1 could be inserted in series with the coil after release of the brake.

And, since the voltage to the brake coil is applied in stepwise fashion, mechanical operation of the brake will take place suddenly, and this has been the cause of vibration and noise.

With the system of the prior technology, which is clearly illustrated in FIG. 6, a brake current independent of the inverter circuit is required. As a result, it requires electrical parts such as transformer TF, limit resistor R1, rectifier CON2, and DC electromagnetic contactors M1 and M2 which are wasteful. And, if cut-off of the brake current IB is carried out directly with the electromagnetic contactor M1, it will shorten the life of the electromagnetic contactor. If an attempt is made to extend the life, it will require an electromagnetic contact of a giant capacity. Also, it is not easy to set the pattern of the brake current IB. It is difficult to give smoothness to the operation of the brake, and it is easy to create shock to the car of the elevator when the brake is open or closed. Losses in the current-limiting resistor R1 is great, and thus it tends to become a heat-generating member in the apparatus.

This invention was made in view of the above-described problems, and its objective is to provide a brake control system in an elevator control apparatus which can run the braking motion smoothly, suppress the vibration of the car or noise of the elevator before and after setting the brake, eliminate the need for the special electric source circuit for the brake, save the electrical parts, prevent the effect of temperature, etc., and extend the life of the parts.

This invention discloses a technology for a brake control system in an elevator control apparatus that uses an inverter device, equipped with a brake power source connected to the DC power source of the inverter which is used in the elevator control apparatus, a current-detecting member disposed between the brake power source and a contact of an electromagnetic contractor, a comparator member which compares the detected magnitude of current and that of a current pattern provided in the control member, and an ON/OFF switching element to turn ON or OFF based on the result of the comparison, so that the operation of the brake can be run smoothly, vibration of the car of the elevator or the noise can be suppressed, a special power source for the brake is not required, electrical parts can be saved, the effect of temperature, etc., can be avoided, and the life of the parts can be extended.

We thus teach a brake control system in an elevator control apparatus that is equipped with a contact of an electromagnetic contactor to connect a brake coil and brake power supply in response to a brake OPEN command, and equipped with a current-detecting member disposed in the circuit of the brake power source to measure the current from the brake power source from the DC side of the inverter used in the elevator control apparatus, a comparator member to compare the detected value against the dictated current pattern prepared in a control element, and an ON/OFF switching element to create an ON/OFF status based on the result of comparison where the switching element controls the brake current by ON/OFF status and also turns OFF the contact of the electromagnetic contactor when the brake current is in zero or near zero status.

The waveform of the brake current pattern described above has a pattern that surges to a selected value in response to a command, further increases to a brake OPEN current value by a certain slope and is held constant thereafter until it receives the brake OPEN signal when it decreases to a HOLD current level until receiving a CLOSE (drop brake) command and decreasing to zero value by a certain slope.

A system utilizing this invention has a circuit constitution where the DC power source of the elevator-controlling inverter is used as the power source of the brake, and the ON/OFF status of the switching element controls the brake current. The ON/OFF status is based on the result of a comparison of the detected current value against the current pattern prepared in the control part by the comparator. As to the method of its operation, the contact of the electromagnetic contactor is turned OFF when the brake current is at zero or near zero status. The waveform of the current pattern created in said control member surges at the value immediately before start of the brake, increases to the brake OPEN current value by a certain slope, decreases to the HOLD current level as it receives the brake OPEN signal, and decreases to zero level by a certain status when it receives the brake CLOSE command.

Because the DC power source of inverter is used directly, the special power source circuit for the brake can be eliminated. And, since the brake current is controlled automatically by the current pattern created in the control member, it will not be affected by environmental conditions, such as temperature and so on. And, furthermore, innovative design of the current pattern can smooth the brake operation and suppress the vibration of the car or noise of the elevator.

As explained above, this invention can provide a brake control system in an elevator control apparatus, which can smooth the operation of the brake, suppress the vibration of the car and noise of the elevator before and after lifting or dropping the brake, eliminate the need for a separate power source circuit for the brake and save electrical parts, avoid the influence of the surrounding conditions such as temperature, etc., and extend the life of the electromagnetic contactor.

These and other objects, features and advantages of the present invention will become more apparent in light of the following detailed description of a best mode embodiment thereof, as illustrated in the accompanying drawing.

BEST MODE FOR CARRYING OUT THE INVENTION

Embodied examples of this invention are explained in detail by referring to the accompanying drawings.

Figure 1:
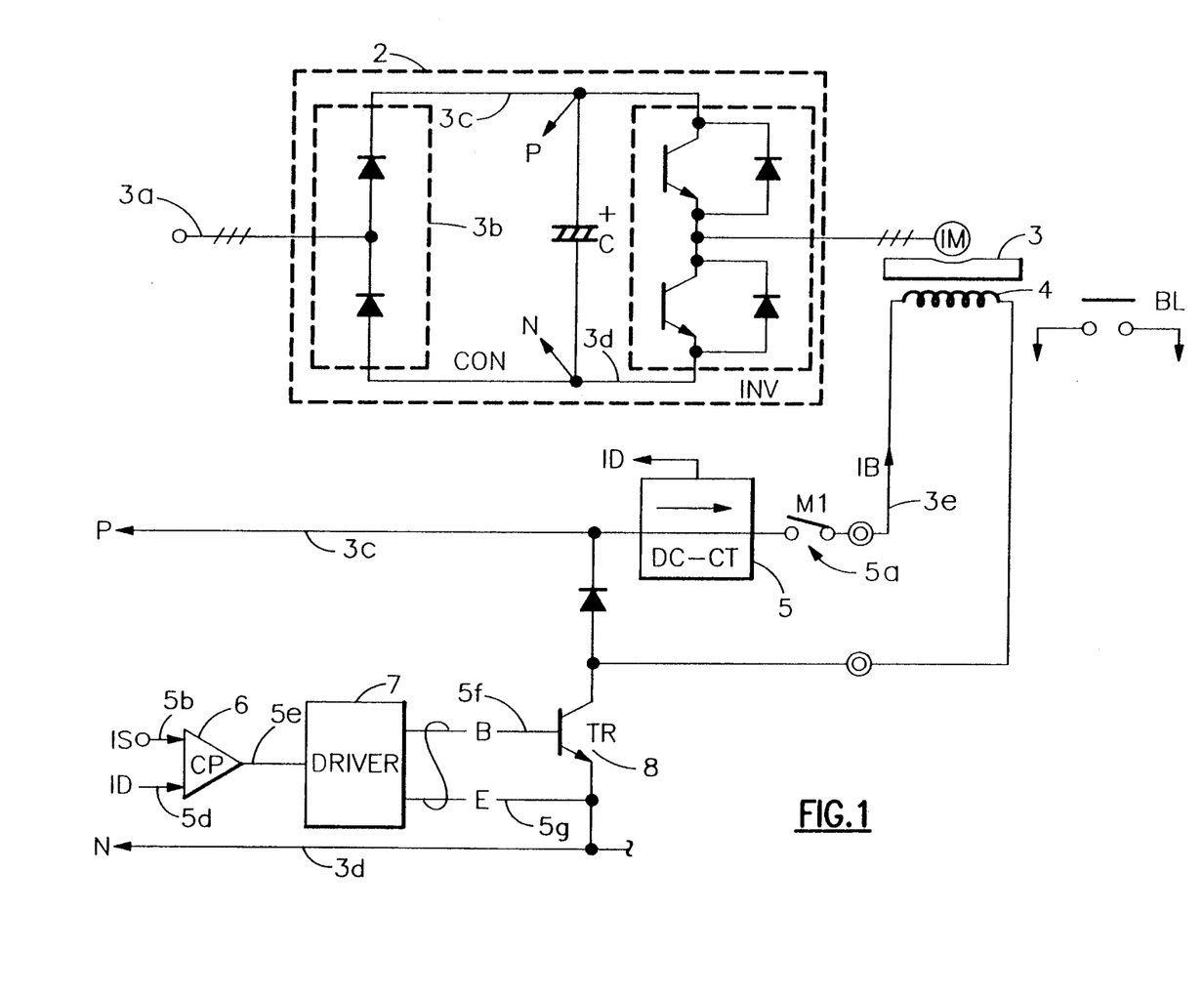
FIG. 1 is a configuration diagram of an embodiment, according to the present invention.
Figure 2A:
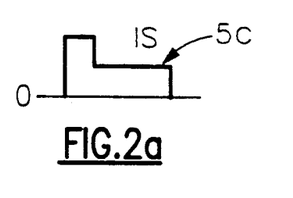
FIG. 2 shows time charts applicable to the embodiment of FIG. 1.
Figure 2B:
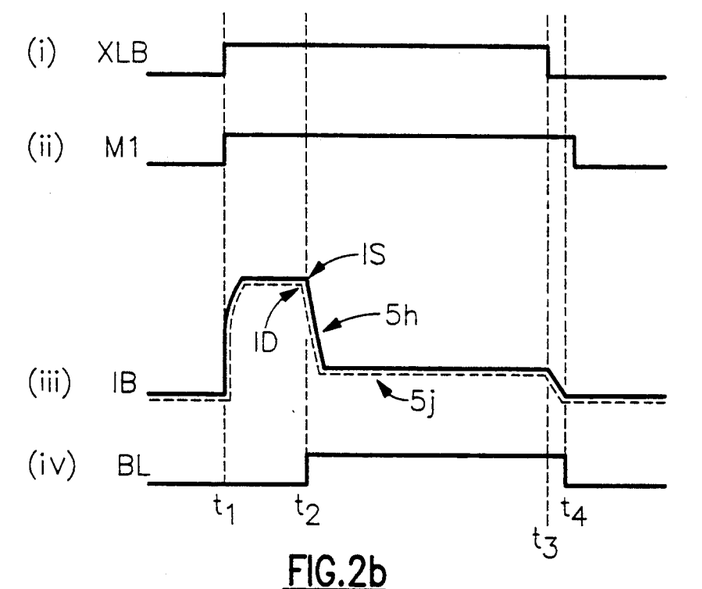

FIG. 1 is a diagram of an embodiment of this invention. In FIG. 1, an induction motor 1 is controlled by an inverter circuit 2, and a brake 3 is mounted on a motor shaft of the induction motor 1. Current on a line 3a from a three-phase AC power source is input to the inverter circuit 2, which is rectified by a rectifying circuit 3b (CON), and DC current on a line 3c, 3d is provided to positive-negative (P-N) terminals of the rectifying circuit. A brake power source which supplies brake current (IB) on a line 3e to a brake coil 4 of said brake 3 uses directly the DC power source P-N of the inverter, according to this invention, and a current detector 5 is provided between the brake power source P-N and a contact (M1) 5a of an electromagnetic contactor. A control element, which is not illustrated, provides a commanded brake current (IS) signal on a line 5b, like the one illustrated by a waveform 5c in FIG. 2(a). The command current IS on line 5b and a detected value (ID) on a line 5d from the current detector 5 are input in a comparator element 6 where they are compared. The two signal levels are shown in FIG. 2(b)(iii) as waveforms 5h, 5j, respectively. An output signal on a line 5e is input to a driver 7 which provides a base signal on a line 5f and an emitter signal on a line 5g, which are together used as the ON/OFF command of a switching element 8 (TR). With this configuration, the electromagnetic contact M1 will become OFF (open) when the IB current on line 3e becomes zero or near zero, while considering the electrical life, as illustrated in FIG. 2(b)(ii).

Therefore, the following will be effected in this embodiment:

(1) because the DC power source of the inverter is used directly, a separate power source circuit for the brake can be eliminated;

(2) because the brake current is controlled automatically, it will not be affected by the surrounding conditions such as temperature and so on; and (3) because the brake current is restricted prior to turning OFF the electromagnetic contactor, it can extend the electrical life of the electromagnetic contactor.

Figure 3:
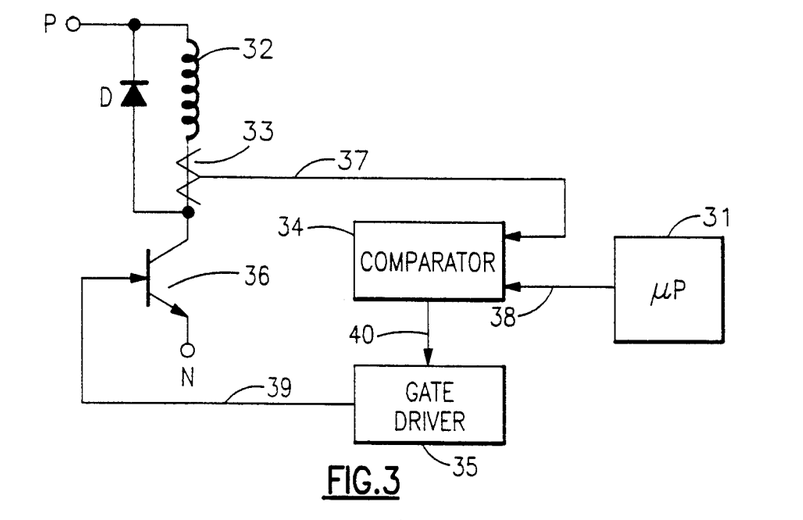
FIG. 3 is a diagram of another embodiment of this invention.

FIG. 3 is a diagram of an example to explain the creation of the current command pattern for smoothing the ON/OFF operation of the brake according to this invention. In FIG. 3, a microprocessor 31 serves as the control element previously referred to above, 32 is a brake coil, 33 is a current detector, 34 is a current-comparing member or a comparator, 35 is a gate driver, and 36 is a switching member of the main circuit. The power source comes from the P-N terminal of the main circuit. A sensed signal on a line 37 represents a current magnitude detected by the current detector 33 and a current command signal on a line 38 has a magnitude of a current pattern provided by the microcomputer unit 31. Their magnitudes are compared at the comparator 34. A gate signal on a line is provided by the gate driver 35 in response to a comparator output signal on a line 40 which turns the switching member 36 ON or OFF. Thus, a feedback loop is formed to control the current flowing through the brake coil 32.

Figure 4:
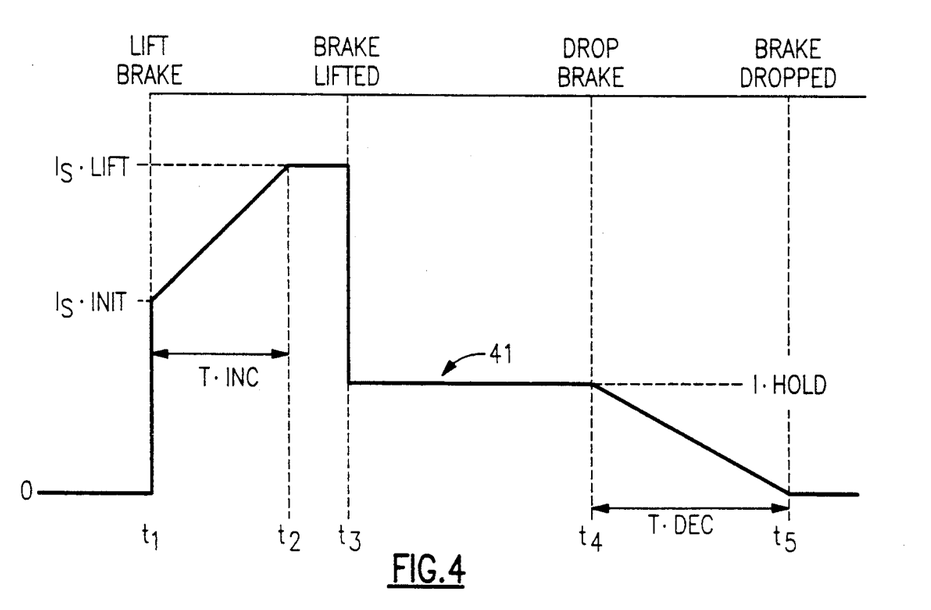
FIG. 4 is a time chart of a brake current command pattern according to the present invention.

In FIG. 4 a waveform 41 is illustrative of the current command pattern on the line 38 provided by the microprocessor 31. In FIG. 4, the waveform 41 of the current command pattern surges at the value (IS.INIT) at time $t_0$ immediately prior to start of the operation of the brake and then increases until time $t_2$ to a BRAKE LIFT current value (IS.LIFT) by a selected slope (T.INC) and levels off until a time $t_3$. As it receives the BRAKE LIFT signal (BRAKE LIFTED) at time $t_3$, it decreases to the level of HOLD current (I. HOLD). And, as it receives the brake DROP command (DROP BRAKE) at time $t_4$, it decreases between time $t_4$ and a time $t_5$ to zero level by a certain slope (T.DEC). With such brake lift/drop action, a discontinuous operation is eliminated by the specific slopes T.INC and T.DEC, and thus it creates a smooth brake LIFT/DROP operation free of shock.

Figure 5:
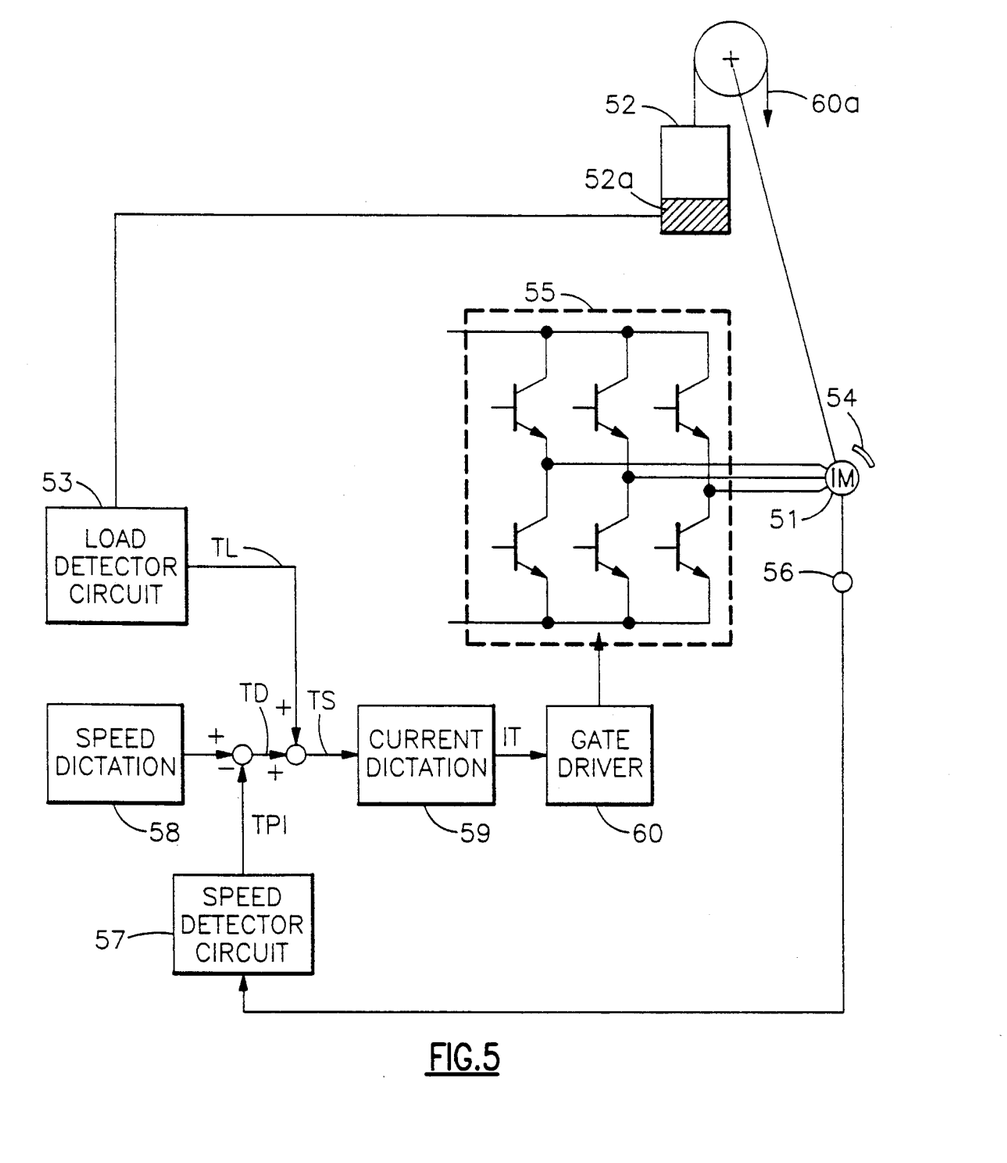
FIG. 5 is a diagram of an elevator control apparatus utilizing the present invention.

FIG. 5 is a diagram of an elevator control apparatus where the example of FIG. 3 is applied. Some parts of this figure are common to the example illustrated in FIG. 1. In FIG. 5, 51 is an induction motor, 52 is the car of the elevator, 52a is a load detector, 53 is a load-detecting circuit, 54 is the brake control member of said induction motor 51, 55 is an inverter circuit, 56 is a velocity detector, 57 is a velocity-detecting circuit, 58 is a velocity command circuit, 59 is a current command-generating member, and 60 is the gate driver of the inverter circuit 55.

The car 52 of the elevator is driven by the induction motor 51. To make the drive take place easily, a counter balance is provided in the direction of the resisting force 60a of the car 52. A load detector 52a is mounted on the car 52 and a torque command TL that corresponds to the load is output from the load detector circuit 53. Velocity of the induction motor 51 is controlled by the inverter circuit 55, and the velocity detector 56 is mounted there. A torque command TD which is generated based on the difference of the value detected by the velocity-detecting circuit 57 and the command value from the velocity command circuit 58 is issued. This value is added with the torque command TL caused by the load, and the result is input as the current command TS into the current command-generating element 59. Gate drive 60 drives the gates of each phase of the inverter circuit 55. The brake-controlling device of this example constitutes the brake control member 54. Using the DC power source of the main circuit of inverter circuit 55, LIFT and DROP of the brake are carried out smoothly as follows, depending on the current command pattern of FIG. 4.

With the conventional control, on the other hand, a torque to stop the car 52 from moving at the time of brake release was generated for the induction motor 51 prior to releasing the brake. However, if the torque did not reach an optimum level due to temperature of the motor or error of the load detector 52a, the brake would open abruptly, and as a result, the car 52 would vibrate.

In addition to the torque control system of the motor, said inverter circuit 55 is equipped also with a velocity control system. Thus, at the point of lifting the brake (at the point when the velocity command is zero), it detects the movement of the car 52 and stops the car 52. However, this velocity control system has a delay. Therefore, if the motion of the car 52 is great, it creates a vibration. In contrast, if the brake is lifted smoothly by the system of this example, it can gradually reduce the friction caused by the brake, to move the car in such a way to reduce the speed of acceleration and to suppress the vibration by the velocity control system.

Thus, this example can perform the LIFT/DROP motion of the brake smoothly and can suppress the vibration of the car of the elevator before and after lifting or dropping the brake.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A control system, comprising:
   a power supply circuit including an inverter having a DC input side;
   a control circuit for conducting a current IB, said control circuit being connected electrically to said DC input side of said inverter, said control circuit including, in electrical circuit connection: a current detector for producing a detected current signal, an electromagnetic contactor having an opened position and a closed position, a coil, a switch having a control line for receiving a control signal for switching said switch from a first state to a second state, said control circuit further including:

a control member for generating a commanded current signal, a comparator having inputs for receiving said detected current signal and said command current signal, said inputs being connected to said control member and to said current detector and also having an output for conducting said control signal, said output being connected to said control line of said switch, so that, when said current IB is substantially zero, said control signal from said comparator causes said switch to change from said first state to said second state, thereby causing said electromagnetic contactor to change from said closed position to said opened position.

2. A system as claimed in claim 1, wherein said commanded current signal increases with a first slope in response to a Lift Brake Command to said control member, and wherein said commanded current signal decreases with a second slope in response to a Drop Brake Command to said control member.

3. A system as claimed in claim 2, wherein said first slope is steeper than said second slope.

* * * * *